United States Patent Office 3,556,730
Patented Jan. 19, 1971

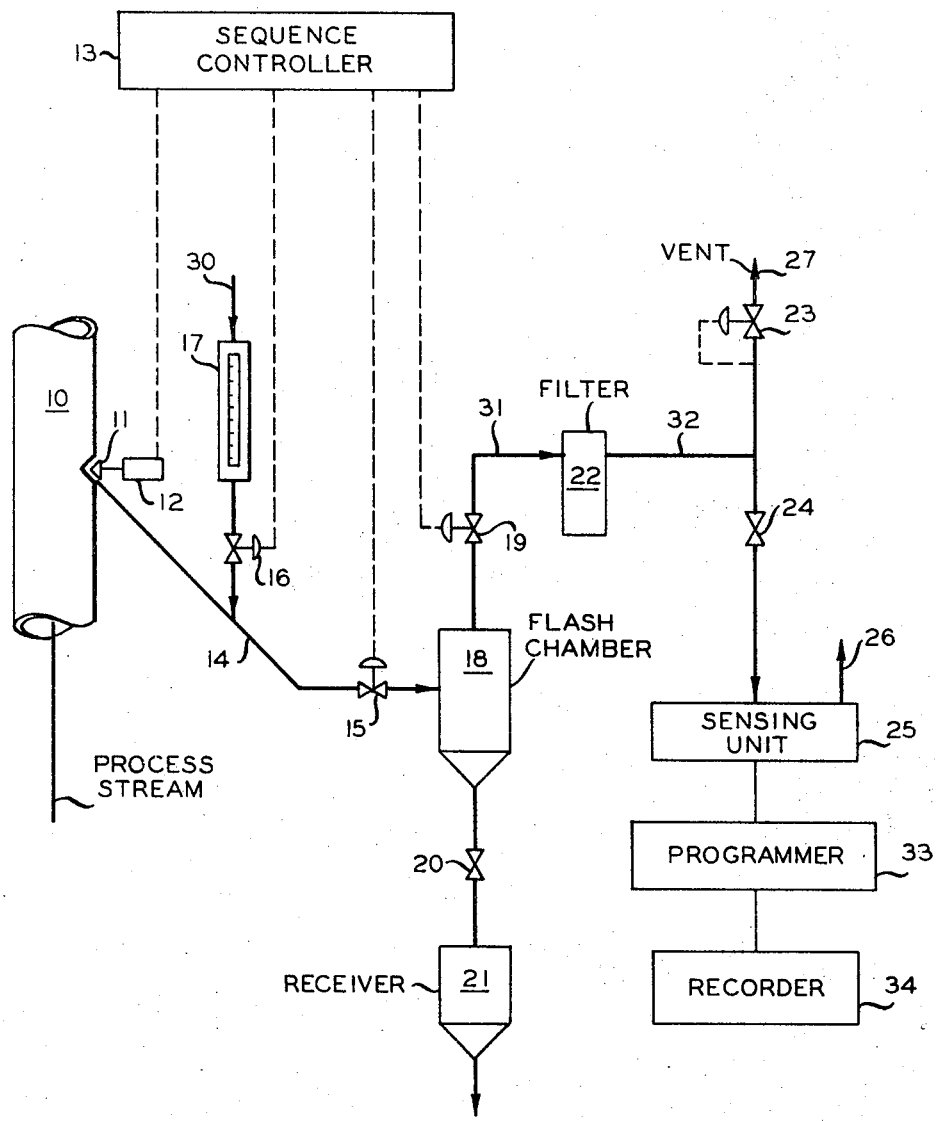

3,556,730
SAMPLING SYSTEM
John Mitacek, Bartlesville, Okla., assignor to Phillips Petroleum Company, a corporation of Delaware
Filed Oct. 21, 1968, Ser. No. 769,077
Int. Cl. G01n 31/08
U.S. Cl. 23—230                                  4 Claims

ABSTRACT OF THE DISCLOSURE

A sample of reactive fluid comprising liquid, dissolved gas and suspended particulate solids is automatically withdrawn from a reactor into a fixed volume chamber by the timed action of a series of controlled valves. The reaction fluid in the chamber is then rendered nonreactive by immediately adding a predetermined volume of reaction termination fluid. The nonreactive sample is automatically discharged into a separation chamber from which part of the dissolved gas and liquid is continuously analyzed.

---

This invention relates to a process and apparatus for obtaining a fluid sample from a stream containing solid particles in suspension. Another aspect of this invention is concerned with a process and apparatus for obtaining a fluid sample from a stream comprising solid particulate polymer suspended in liquid hydrocarbon. Another aspect of this invention is concerned with a process and apparatus for obtaining a fluid sample from a stream comprising solid-particulate polymer suspended in a liquid hydrocarbon stream which contains absorbed and dissolved gas. Another aspect of this invention is concerned with a process and apparatus for periodically obtaining a fluid sample from a reactive mixture, and stopping the reaction of said mixture before analysis.

Various 1-olefins have been polymerized by contact with chromium oxide catalysts deposited on a suitable carrier to obtain solid polymer. The polymerization is effected with the catalyst dispersed in a hydrocarbon diluent such as a paraffinic or naphthenic hydrocarbon. A bulk or mass polymerization is sometimes used in the absence of an extraneous diluent, i.e., using the liquid reactant as the sole diluent. The reactants are maintained in solution in the extraneous diluent by application of suitable pressure. When polymerizing ethylene, propylene, and butylene and other unsaturated hydrocarbons either individually or in mixtures in the presence of a suspension of catalyst in diluent, said diluent having low solubility for the polymer, the polymer is produced in the form of solid particles, insoluble in the diluent, substantially non-tacky, and nonagglutinative. These processes are classified as particle-form or reactive slurry reactions. The effluent from a particle-form process comprises solid polymer particles, liquid and gaseous reactants, and also a minor proportion of liquid polymer solution in the diluent and absorbed onto the polymer particles.

In controlling the reaction conditions and input component quantities in a polymerization process, it is conventional to sample the reactor contents or effluent continuously or periodically, passing the sample to an instrument designed to analyze the reactants and control one of the variables of the process in response with the analysis of the sample. Such instruments as infrared analyzers, differential refractometers, ultraviolet spectrophotometers, mass spectrometers, and chromatograph analyzers, all of which are conventional instruments can be used in various ways to analyze liquid or vapor samples recovered.

Because of the presence of the polymer in solid particulate and liquid forms, it has been advantageous to sample only vapor from the polymerization processes to obtain the concentration of the reactants during the course of the reaction in order to control flow rates of the input reactants. This was convenient both because of the difficulty in obtaining a representative sample of a process liquid containing particulate solids and because the analytical techniques require removal of particulate solids, both of polymer and also of the solid catalyst, and of liquid polymer.

The process and apparatus of this invention are useful for sampling batch and continuous preparation of ethylene and propylene polymers, in particular ethylene/propylene copolymers. In general, a propylene-ethylene mixture is polymerized in liquid propylene or a hydrocarbon diluent in the presence of catalyst active for such polymerization. Although not essential to the conduct of polymerization, it is often desirable to carry out the polymerization in the presence of elemental hydrogen. During the conduct of these reactions it is essential to maintain the proper relation between the ethylene, propylene, and hydrogen concentrations in the reaction mixtures. The prior art method of sampling these reaction mixtures generally included obtaining a sample of vapor present in said reaction mixtures. When the reaction is carried out in a batch type process, a vapor phase generally exists in the upper portion of the reaction vessel. Samples are extracted from this vapor portion by conventional methods. The proportions of components in the liquid reactant phase of said reaction mixture are then calculated from the composition of those components in the vapor phase using experimental vapor-liquid equilibrium constants. Such a method thus has inherent error due to the difficulty of obtaining accurate experimental equilibrium constants over wide ranges of temperature and pressure. An additional error is caused by the fact that the liquid and vapor phases are probably not in equilibrium, and thus the concentration of reactants in the liquid reactive medium which is needed to control the reaction is not correctly reflected by analyses of vapor samples.

Polymerization processes may be carried out in continuous, stirred-tank or loop-type reactors. Experimental data obtained by vapor phase sampling of such reactors has been proven to be even more unreliable and unreproducible than data obtained from batch-type reactors. Generally the reactants in stirred-tank or loop-type reactors are propelled at very high velocities in order to maintain the catalyst and particulate polymer produced in a suspended state and to prevent deposition or "growing" of polymer on the reactor walls. It is therefore necessary that no vapor phase be present in the reactor where polymer might grow and also because the agitation means might accumulate a pocket of vapor and become inactive. In order to take a vapor sample from said reactors, it is necessary to place a standpipe in the uppermost portion of said reactor to collect vapor. Samples are then taken from the vapor in the standpipe. However, the vapor in said standpipe is stagnant and not in equilibrium with the reactants; and hence, it is almost entirely impossible of obtain a representative sample.

Vapor sampling of polymerization reactions, however, does have an important advantage over the heretofore unsuccessful liquid sampling systems of the prior art. The reaction necessarily takes place in the liquid phase which contains the catalyst; hence, the vapor phase alone is nonreactive. Samples taken from the vapor phase are thus indicative of compositions in the vapor phase existing in the vessel at the time they were taken, and residence time in the sampling system need not be taken into account to determine what the reaction composition was at the time of sampling. Also reaction rates are dependent to some extent on the mixing in the reaction vessel which is almost impossible to duplicate in the sampling system. Although liquid samples alleviate the problems of equilibrium and calculations mentioned above, they are reactive and thus residence time in the sampling system must be taken into account. For example, in the second-stage of an ethylene-propylene polymerization, gaseous reactants are continually added to the reaction mixture and are consumed. If a sample of such a mixture is extracted and isolated, with the passage of sufficient time the reactants will be consumed making a determination of reaction vessel conditions impossible.

Accordingly it is an object of this invention to provide a process and apparatus for obtaining a total fluid sample from a stream containing particulate solids in suspension in a liquid lighter than the solids and also containing dissolved gas. Another object is to provide a process and apparatus of obtaining from a stream containing particulate solid polymer in suspension in at least one liquid hydrocarbon and at least one gas, a total fluid sample and recovering gas from said sample for analysis. A further object is to obtain from such a stream a fluid stream substantially free of solids for analysis in a suitable analyzing instrument. Another object is to provide a process and apparatus for taking intermittent samples directly from the reaction mixture in such a manner that continuous analysis is obtained. Another object of this invention is to provide a process and apparatus for obtaining a total fluid sample in the above-mentioned streams and for terminating the reaction of components in said stream immediately after removing said sample from said stream such that a sample is obtained which is indicative of the system at the time when said sample was removed.

SUMMARY OF THE INVENTION

Accordingly, a broad aspect of the process of this invention comprises the steps of periodically removing a portion of a reactive fluid into a treating zone, said reactive fluid comprising particulate solids in suspension in a liquid lighter than said solids and also containing dissolved gas, adding a reaction termination fluid to said reactive fluid thus forming a nonreactive fluid, transferring said nonreactive fluid from said treating zone into a separation zone, withdrawing vaporized liquid and gas in a first stream and particulate solids in a second stream, and continuously analyzing a portion of said first stream. The foregoing steps can be repeated at frequent intervals such that continuous analysis output is achieved.

Accordingly another aspect of this invention comprises an arrangement of an apparatus for obtaining a total fluid sample in accordance with the above-said process. The apparatus comprises a first line in communication with the source of the reactive fluid, means for separating a nonreactive fluid into a separate stream of particulate solids and a stream containing gas and vaporized liquid; a first valve in said first line intermediate said separating means and said source of said reactive fluid, a second valve in said first line immediately adjacent said source of said reactive fluid; a second line in communication between the source of a reaction termination fluid and said first line at a point intermediate of said first and second valves, a third valve in said second line intermediate of said source of fluid and said second line, means for periodically and simultaneously opening said second valve and closing said first and third valves to admit said reactive fluid into said first line and closing said second valve and opening said third valve while maintaining said first valve closed to admit said reaction termination fluid into said first line thus forming a nonreactive fluid and then closing said third valve and opening said first valve while maintaining said second valve in a closed position to admit said nonreactive fluid into a separation means, means for removing a gaseous stream from said sampling means and means for removing a solid stream from said separation means, and means for analyzing a portion of said gaseous stream.

Accordingly still another aspect of this invention is an arrangement of another apparatus for obtaining a total fluid sample in accordance with the above-said process. The apparatus comprises a first line in communication with the source of the reactive fluid, means for separating a nonreactive fluid into a separate stream of particulate solids and a stream containing gas and vaporized process liquid; a first valve in said first line intermediate said separating means and said source of said reactive fluid, a second valve in said first line immediately adjacent said source of said reactive fluid; a second line in communication between the source of a reaction termination fluid and said first line at a point intermediate of said first and second valves, a third valve in said second line intermediate of said source of said reaction termination fluid and said second line means for periodically and simultaneously opening said second and said third valves and closing said first valve to simultaneously admit said reactive fluid and said reaction termination liquid into said first line immediately forming a nonreactive fluid and closing said second and said third valve and opening said first valve while maintaining said second valve and said third valve in a closed position to admit said nonreactive fluid into a separation means, means for removing a vapor stream from said sampling means and means for removing a solid stream from a sampling means, and means for analyzing a portion of said vapor stream.

DESCRIPTION OF PREFERRED EMBODIMENTS

A more complete understanding of the invention may be had by reference to the schematic drawing which shows an arranement of apparatus in accordance with a preferred embodiment of the invention.

Referring to the figure, a particle-form reactor 10 represents either a stirred-tank or a continuous flow loop-type reactor. A liquid sample is removed from reactor 10 at point 11 by opening valve 12. The opening and closing mechanism of valve 12 is placed as close to reactor 10 as is possible due to the limitations of valve size, fittings, etc. Valve 12 is open only long enough to take a sufficient sized sample such that analytical error is minimized. The size of the sample is determined by the volume of pipe 14 which extends between valve 12 and valve 15 which is closed during the sampling of the reactor. Pipe 14 thus forms a treating zone. Valve 12 then closes and valve 16 which has been closed during the opening of valve 12 then opens to admit reaction termination fluid into treating zone 14 from source 30.

Generally speaking the main purpose of the reaction termination fluid is to render the catalyst in the system inactive such that no further polymerization takes place and hence residence time in the sampling system is not a factor in calculating reaction component concentrations from the ensuing analytical data. For example, in the batch and continuous preparation of ethylene/propylene block copolymers, a wide variety of catalyst systems can be employed in the polymerization. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl, or aryl radical or combinations of these radicals, such as alkaryl, aralkyl and alkylcycloalkyl, X is hydrogen or a halogen, including chlorine, bromine, iodine, and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Groups IV–B, V–B, VI–B, or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri - n-butylaluminum, tri - n - pentylaluminum, triisooctylaluminum, tri-n-dodecylaluminum, triphenylaluminum, and the like.

The metal halide component of the catalyst system is preferably a halide of a Group IV–A metal, i.e., titanium, zirconium, hafnium and germanium. However, it is to be understood that halides of metals of the other groups specified above, such as vanadium, molybdenum, tungsten, cobalt, and iron can also be employed in the catalyst system. The trichlorides, trifluorides, tribromides, and triiodides, as well as the tetrachloride, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization.

The preferred catalyst system employed in the polymerization comprises a dialkylaluminum chloride and titanium trichloride, the latter compound preferably being prepared by reduction of titanium tetrachloride in the presence of aluminum. The reduction product is preferably a complex having the formula $3TiCl_3 \cdot AlCl_3$. The reduction reaction is usually carried out at an elevated temperature, for example, at a temperature in the range of 360 to 600° F., preferably from 375 to 450° F.

A different catalyst frequently used in particle-form polymerization of ethylene is the chromium oxide system of Hogan and Banks described in detail in U.S. Pat. 2,825,721.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02:1 to 50:1. When employing the preferred catalyst system, the mol ratio of the dialkylaluminum halide to the titanium trichloride complex usually ranges from 1:0.005 to 1:50, preferably 1:0.1 to 1:10. The amount of the dialkylaluminum halide used should be at least 1.0 times $10^{-4}$ gm./gm. of monomer and can be as much as 25 times $10^{-4}$ gm./gm. of monomer. The amount of titanium trichloride complex employed would generally be in the range of 1.5 times $10^{-4}$ to 10 times $10^{-4}$ gm./gm. of monomer.

In general the reaction terminating agents which are suitable for deactivating the above-mentioned catalysts are diketones in the presence of the monomer oxide, for example in the preparation of ethylene/propylene copolymers, propylene oxide can be employed with acetylacetone.

The diketones suitable for use in the practice of the present invention include alpha-diketones and beta-diketones. These diketones can also be defined as being selected from the group consisting of compounds having the formulas:

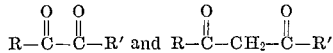

wherein R and R' are hydrocarbon radicals, such as alkyl, cycloalkyl and aryl. Examples of siutable alpha-diketones include the following: 2,3-butanedione, 2,3-pentanedione, 3,4-hexanedione, 4-methyl-2,3-pentanedione, 3,4-heptanedione, and the like. The following examples are of suitable beta-diketones: 2,4-pentanedione (acetylacetone), 2,4-hexanedione, 2,4-heptanedione, 5-methyl-2,4-hexanedione, 2,4-octanedione, 5,5-dimethyl-2,4-hexanedione, and the like.

Alcohols such as methanol, ethanol, propanol, etc., may also be used as terminating fluids.

The reaction termination fluid can be monitored by the use of such devices as a Jerguson sight glass 17. Depending upon the volume contained in treating zone 14 the proper amount of reaction termination fluid can be calculated when the catalyst concentration is known. The pressure on the Jerguson sight glass 17 can be adjusted such that for the time that valve 16 is open the proper amount of reaction termination fluid is introduced into pipe 14 such that all of the catalyst is essentially deactivated rendering the entire fluid in zone 14 nonreactive and hence not subject to errors in analysis, due to residence time. For more precise addition of the reaction termination fluid, small adjustments may be made in the timing mechanism as explained below to adjust the length of time which valve 16 remains open.

In another embodiment of this invention valve 16 is placed immediately adjacent valve 12. When valve 12 is opened to admit the sample of reaction fluid from reactor 10 valve 16 is immediately opened to admit reaction termination fluid to the process liquid as its enters pipe 14. Thus the process fluid is rendered nonreactive immediately upon its entrance to sampling system. This method has the distinct advantage over that method previously discussed in that mixing and distribution difficulties are minimized with this particular operation. In the embodiment in which the reaction termination fluid is not admitted to pipe 14 until valve 12 is closed, an excess of termination fluid may have to be used to insure adequate contacting of all catalyst.

After the sample has been taken and rendered inactive, valves 12 and 16 are closed and valve 15 is opened in order to admit the nonreactive sample into flash chamber 18. Pressure in flash chamber 18 is significantly lower than the reaction pressure in reactor 10 and also in sample pipe 14. During the entire sequence as has been delineated above, valve 19 remains in a closed position. The nonreactive sample is partially vaporized in passing through valve 15 and further vaporized in flash chamber 18 such that only solid particulate polymer, solid inactive catalyst and traces of liquid polymer are removed from flash chamber 18 through valve 20 into receiver 21. Valve 19 remains closed a sufficient amount of time such that the vapor in chamebr 18 is thoroughly mixed such that a representative sample may be taken. Valve 15 is closed and after the lapse of time sufficient to insure proper mixing of the vapor in the flash chamber 18, valve 19 is opened to remove vaporized reaction components to the analytical section of the apparatus. Vaporized gas can be passed through filters 22 in order to insure complete removal of any entrained liquids and/or solids. If necessary cyclone separators may be employed in between valve 19 and filter 22. Filter 22 may be any commercial filters capable of removing finely divided solids from gas. A chamber filled with glass fibers will suffice or filters employing paper elements such as made by Cuno or Sparkler are satisfactory. Valve 23 is a back pressure control valve which is set at a predetermined pressure to insure constant pressure upstream of sampling valve 24 to insure flow of sample into the analytical equipment, After substantially all of the vapor has left flash chamber 18 valve 19 is closed, a portion of the vapor in line 32 is sampled by the opening of valve 24 by sampling device 25 which may be any of the analytical instruments as delineated above. This particular system is extremely suitable for the use of gas chromatograph as sampling device 25. After the sample passes through sampling device 25 and has been analyzed, it exits through vent 26. Any excess vapor not required for the sampling procedure is vented through line 27. The electrical impulses generated by sampling device 25 which are representative of sampling components in the vapor sample are passed to programmer 33 which subsequently sends signals representative of the electrical impulses from sensing unit 25 to the recorder 34 which produces the visual analytical data representative of the components in the vapor sample.

In a preferred embodiment of this invention valves 12, 16, 15, 19 and 24 are operatively connected to sequence controller 13 which may be any of several commercially available timers such as those supplied by Industrial Timer Corp., Parsippany, N.J. McKay describes in detail the operation of such timers in U.S. 2,921,593. Very briefly, timer or sequence controller 13 is adjusted to open and close the necessary valves in any sequence for any desired length of time.

EXAMPLE

In a typical illustration of the use of the invention, an 88-gallon reactor was operated in a pilot plant in the production of a propylene-ethylene copolymer. Operated in batch manner, the reactor was first filled with approximately 75 gallons of liquid propylene at a temperature of 120° F. at which temperature it had a vapor pressure of 282 p.s.i.g. Hydrogen was then sparged into the liquid propylene in the reactor until a pressure increase of about 20 p.s.i. was observed, i.e., a total pressure within the reactor of 302 p.s.i.g. was obtained. Previous experience had shown that a 20 p.s.i. partial pressure of hydrogen in the vapor phase was approximately that desired in producing a propylene-ethylene copolymer of desired melt flow. For precise control of melt flow, however, a more exact knowledge of hydrogen concentration in the liquid phase was necessary. To obtain this information, the sampling system of my invention was placed in operation by operating the valves as numbered in the figure in the following sequence:

ene product reached a concentration of 35 weight percent in the residual liquid propylene. During this period additional samples were removed and analyzed for hydrogen at a frequency of about every 3 minutes. Hydrogen flow rate to the reactor was manipulated in response to the analyses obtained to maintain a concentration of nearly exactly 0.140 mol percent. A polypropylene product with melt flow of 8.0 was produced.

At this point, the reactor and contents were cooled to 55° F. and ethylene sparged into the reactor until 28 pounds had been added. The ethylene then proceeded to react to form the desired propylene-ethylene copolymer. Ethylene reaction continued for 1.5 hours at a temperature of 55 to 60° F. During the ethylene polymerization period, samples were again taken every 3 minutes and analyzed for ethylene concentration—no hydrogen was added during this period. When the ethylene concentration decreased from 14 mol percent to 5 mol percent, the reaction was terminated by contact with acetylacetone. A copolymer with a desired ethylene content of 60 percent was thus produced. The melt flow of the final copolymer product was 3.0. Accurate analysis of the liquid phase was thus necessary in first producing a polypropylene homopolymer with desired melt flow and finally in polymerizing sufficient additional ethylene to produce the final product with desired melt flow.

In previous operations wherein the vapor phase in the reactor was sampled for hydrogen and later for ethylene,

TABLE

| Valve No.: | Time, seconds | | | | |
|---|---|---|---|---|---|
| | 0 | 5 | 10 | 20 | 25 |
| 12 | Opens | Closes | Closed | Closed | Closed. |
| 16 | Closed | Opens | Closes | do | Do. |
| 15 | do | Closed | Opens | Closes | Do. |
| 19 | Open | Closes | Closed | Opens | Open. |
| 20 | do | do | do | Closed | Opens. |

The cycle then repeats at approximately 30 second intervals.

Thus at time 0, valve 12 opened to admit a sample of liquid propylene into zone 14. At time 5 seconds, valve 12 was closed and valve 16 opened to admit terminating fluid to the sample trapped between valves 12 and 15. Terminating fluid was not actually needed at this stage as no catalyst had yet been added to the reactor but this illustrates operation with catalyst present. At time 10 seconds, valve 15 opens to allow the nonreactive sample to flash into low-pressure chamber 18 with valves 19 and 20 closed. At time 20 seconds, having allowed equilibrium to be established in the gas phase within the chamber 18, valve 19 opens and allows a portion of the gas to pass to gas chromatograph 25 for determination of hydrogen concentration. This was determined, for example, to be 0.135 mol percent. The hydrogen concentration is thus determined with an accuracy of ±0.001 mol percent, an accuracy needed for precise control of polymer melt flow. The desired polypropylene melt flow of 8.0, however, requires a hydrogen concentration of 0.140—a concentration of 0.135 mol percent would give a melt flow of 10 or higher. Additional hydrogen was passed to the reactor until a hydrogen concentration of 0.140 was obtained by my sampling system.

Having thus established the correct hydrogen concentration in the liquid propylene in the reactor, catalyst in the form of 25 weight percent diethylaluminum chloride dispersed in hexane was passed to the reactor until a total of 450 ml. of dispersion had been added. Titanium trichloride-aluminum trichloride complex prepared as a suspension in hexane was added to the reactor until 0.17 pound of the complex had been added. The reaction then started and was allowed to proceed at a temperature of 120° F. for 4.5 hours at which time the solid polypropylconcentrations were found to vary so erratically that proper control of the concentrations could not be made to obtain products with desired properties. In contrast, the sampling system of my invention gave very consistent and uniform values which made it possible to maintain the concentrations at desired levels and hence obtained products with consistent, desired properties.

That which is claimed is:

1. A system for taking a total sample from a source of reactive fluid comprising suspended particulate solids heavier than said reactive fluid which comprises a first line in communication with said source of reactive fluid and separating means for separating said particulate solids from a nonreactive fluid and dissolved gas, and means for vaporizing said nonreactive fluid to form a first stream of particulate solids and a second stream comprising vaporized liquid and said gas; a first valve in said first line intermediate said separating means and said source of reactive fluid; a second valve in said first line immediately adjacent said source of reactive fluid; a second line in communication between a source of a reaction termination fluid and said first line at a point intermediate of said first and second valves; a third valve in said second line; intermediate of said source of said reaction termination fluid and said second line, means for periodically simultaneously opening said second valve and closing said first and third valves to admit said reactive fluid into said first line and then closing said second valve and opening said third valve while maintaining said first valve closed to admit said reaction termination fluid into said first line, forming a nonreactive fluid and then closing said third valve and opening said first valve while maintaining said second valve in a closed position to admit said nonreactive fluid into said sampling means; and means for analyzing a portion of said second stream.

2. A process for sampling a source of reactive fluid comprising liquid, dissolved gas and suspended particulate solids heavier than said reactive fluid which comprises the steps of (1) periodically flowing a predetermined volume of said reactive fluid into a sample treating zone (2) adding immediately to said reactive fluid in said sample treating zone a predetermined volume of reaction termination fluid sufficient to form a nonreactive fluid, (3) transferring said nonreactive fluid from said sample treating zone into a separation zone, (4) withdrawing from said separation zone vaporized liquid and said gas in a first stream and said particulate solids in a second stream, and (5) continuously analyzing said first stream.

3. A process according to claim 2 wherein said particulate solids comprise a particulate polymer of at least one 1-olefin and polymerization catalyst, said reactive fluid comprises liquid polymer, liquid hydrocarbon, and at least one 1-olefin monomer and said gas comprises hydrogen.

4. A process according to claim 2 wherein step (5) comprises analyzing a portion of said first stream, comprising vaporized liquid and said gas, by chromatography.

References Cited

UNITED STATES PATENTS

| | | | |
|---|---|---|---|
| 2,753,246 | 7/1956 | Shields et al. | 73—422X |
| 2,955,457 | 10/1960 | Peters et al. | 73—421.5X |
| 3,131,033 | 4/1964 | Van Volkenburgh | 23—285X |
| 3,293,918 | 12/1966 | Zavasnik | 73—422 |
| 3,429,186 | 2/1969 | Price et al. | 73—421.5 |

LOUIS R. PRINCE, Primary Examiner

H. C. POST III, Assistant Examiner

U.S. Cl. X.R.

23—253; 73—23.1, 421.5